April 14, 1942.  R. B. COTTRELL  2,279,914
FRICTION ABSORBING DEVICE
Filed Feb. 21, 1940  2 Sheets-Sheet 1
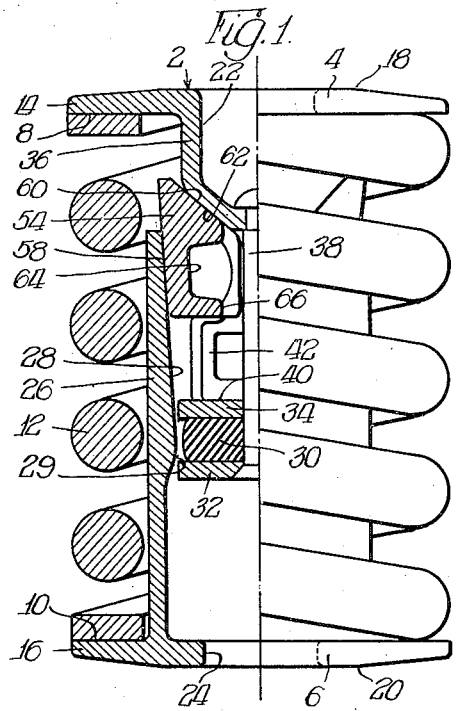
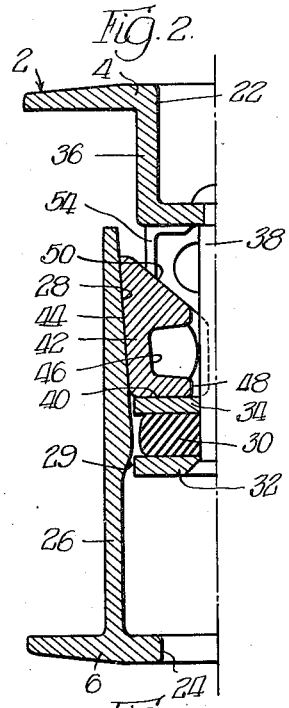
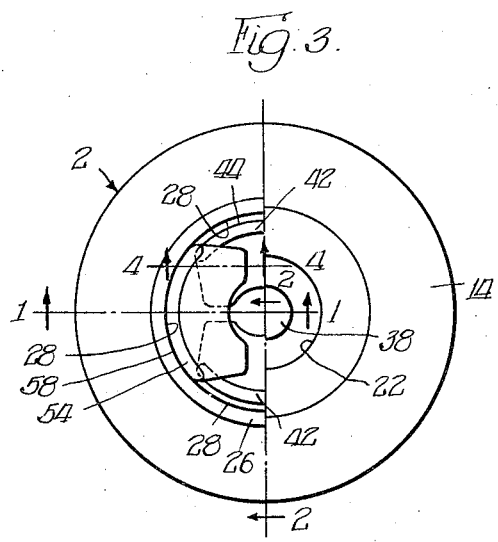
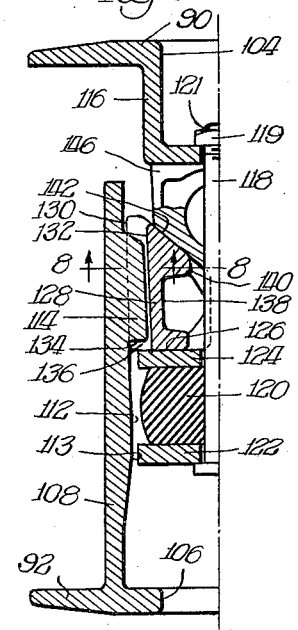
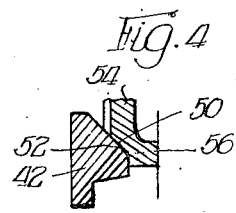
INVENTOR.
Robert B. Cottrell,
BY
ATTORNEY.

April 14, 1942.  R. B. COTTRELL  2,279,914
FRICTION ABSORBING DEVICE
Filed Feb. 21, 1940  2 Sheets-Sheet 2
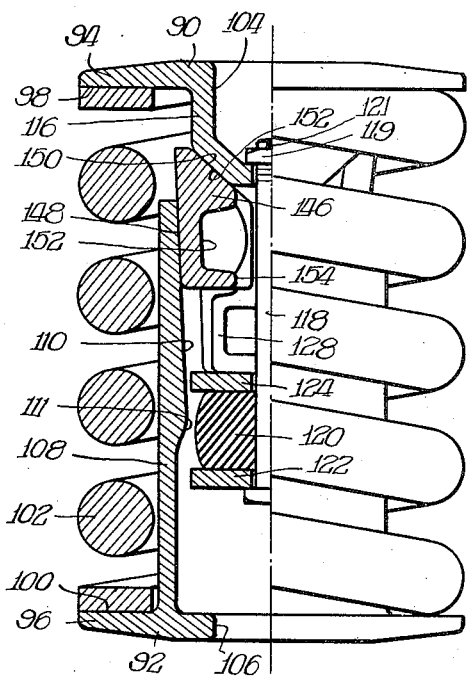
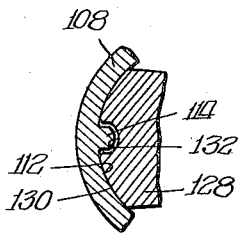
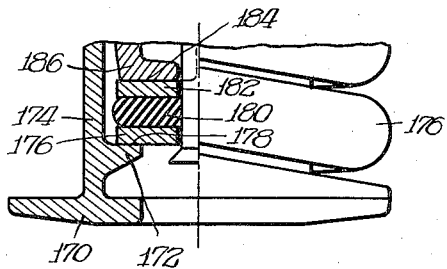
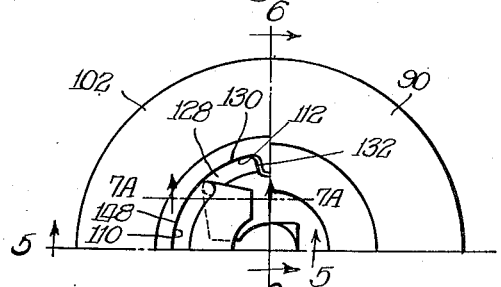
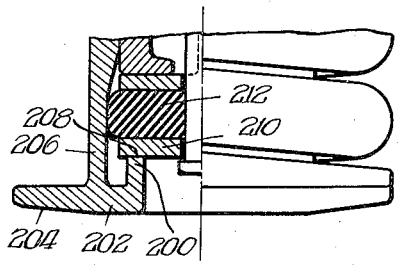
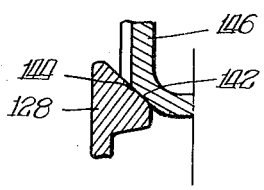
INVENTOR.
Robert B. Cottrell,
BY Orin O. B. Garner
ATTORNEY.

Patented Apr. 14, 1942

2,279,914

UNITED STATES PATENT OFFICE 2,279,914

FRICTION ABSORBING DEVICE

Robert B. Cottrell, Chicago, Ill., assignor to American Steel Foundries, Chicago, Ill., a corporation of New Jersey Application February 21, 1940, Serial No. 320,149

33 Claims. (Cl. 267—9)

My invention relates to friction absorbing devices and more particularly to such a device comprising a clutch mechanism having sets of shoes arranged in series and operable within a compression spring.

My invention contemplates such a series type arrangement in which forces pass successively through angularly spaced sets of shoes and thus greatly increase the frictional absorption of the device as by the compounding of said forces.

My invention comprehends a friction absorbing device comprising a bottom follower having a cylindrical housing with sets of tapering internal friction faces extending within a compression spring and a clutch assembly supported from a top follower and extending within said housing for frictional engagement therewith, said assembly including resilient means spaced from said top follower and a plurality of sets of shoes in series wedged between said top follower and resilient means, said sets of shoes being arranged along angularly spaced axes and having overlapping relationship longitudinally of said housing.

I have referred to my clutch assembly as including an arrangement wherein sets of shoes are arranged in series in order to compound the forces of frictional absorption. For a complete theoretical discussion of such a clutch arrangement reference is hereby made to my United States Letters Patent No. 2,207,287 entitled Draft gear and issued July 9, 1940. For the present purpose it may be noted that such a mechanism enables the device to absorb a greater force than the capacity of the spring associated therewith. Where a single set of shoes is used the multiplying factor depends on the various angles of the friction surfaces of wedges and shoes. Where a second set of shoes is introduced in series with the first as in my present arrangement, the second set of shoes multiplies the resistance of the first set of shoes instead of simply multiplying the resistance of the spring capacity. Such mechanisms have sometimes been described as multiple action clutches but not practical arrangement of such a device has been put in use although theoretical embodiments of the idea have been set forth.

Such a multiple action clutch affords considerably more shock absorption for a given spring capacity than can be obtained otherwise or an equivalent amount of shock absorption can be obtained with a lesser spring capacity. It is apparent, therefore, that in such an arrangement greater capacity may be achieved within smaller space limitations than would otherwise be possible. In the modifications I have herein set forth I make use of two sets of two shoes each, arranged along axes at right angles to each other within the housing against which they have frictional engagement.

Another object of my invention is to design such a friction absorbing device wherein the clutch mechanism includes a resilient member which may be placed under variable compression to change the amount of friction absorption developed as desired.

A specific object of my invention is to design such an arrangement wherein top and bottom followers may have wedge means extending within a coil spring, and wherein resilient means may be supported and spaced from said top follower to afford resilient resistance to the downward movement of sets of shoes supported in series along angularly spaced axes between said top follower and said resilient means.

A different object of my invention is to provide an arrangement of the above type wherein the inner resilient means may be placed under suitable initial compression and thus maintain said device in assembled relationship by the frictional absorption so developed.

A further object of my invention is to design a snubbing device of the series type wherein one of the sets of shoes is afforded guiding means to retain them in proper spaced relationship.

My invention further contemplates a snubbing device of the series type in which novel interlocking means are provided between one of the followers and the clutch assembly.

My invention further contemplates such a series arrangement as above described wherein said bottom follower is afforded stop means for abutment with said clutch means, whereby the frictional absorption of said device is increased to a maximum.

In the drawings,

Figure 1 is a side elevation embodying one modification of my invention, partly in section, the section being taken substantially in the vertical plane bisecting the structure as indicated by line 1—1 of Figure 3.

Figure 2 is a fragmentary sectional view of the device shown in Figure 1, the section being taken substantially in the vertical plane bisecting the structure as indicated by line 2—2 of Figure 3.

Figure 3 is a top plan view of the modification shown in Figure 1, the right half showing a top view of the top follower and the left half showing a top view of the device with the top follower removed.

Figure 4 is a fragmentary sectional view showing the overlapping relationship of the sets of shoes, the section being taken substantially in the plane indicated by line 4—4 of Figure 3.

Figure 5 is a side elevation of a different modification of my invention, partly in section, the section being taken substantially in the plane indicated by line 5—5 of Figure 7.

Figure 6 is a fragmentary sectional view of the device shown in Figure 5, the section being taken substantially in the plane indicated by line 6—6 of Figure 7.

Figure 7 is a top plan view of one-half of the device shown in Figure 5, the right quarter section being a view with the top follower in place and the left quarter section being a view with the top follower removed.

Figure 7A is a fragmentary sectional view showing the overlapping relationship of the outer and inner sets of shoes of the device shown in Figure 5, the section being taken substantially in the plane indicated by line 7A—7A of Figure 7.

Figure 8 is a fragmentary sectional view of the device shown in Figure 5, the section being taken substantially in the plane indicated by line 8—8 of Figure 6.

Figure 9 is a fragmentary side elevation showing a different embodiment of my invention, the section being taken in substantially the same plane as that shown in Figure 2.

Figure 10 is a fragmentary side elevation of a different modification of my invention, the section being taken in substantially the same plane as that shown in Figure 6.

Describing my invention in greater detail and referring first to the modification shown in Figures 1 to 4, the snubbing device generally indicated at 2 (Figure 1) comprises a top follower 4 and a bottom follower 6, said followers affording seats for the coil spring 12 as at 8 and 10 by means of the respective annular flanges 14 and 16 provided around the outer circumference of their bases. The outer faces of said top and bottom followers may be of general arcuate form as at 18 and 20 affording convenient seating means for said device, said faces being interrupted centrally thereof by the recesses 22 and 24 respectively which provide positioning means for said device in well-known manner. The bottom follower 6 may have integrally formed thereon a cylindrical housing or barrel 26 extending within said spring and having sets of diametrically opposite tapering friction faces 28, 28 which extend downwardly and inwardly to a point 29 conveniently spaced from the top of said housing.

Received within the open end of said housing 26 may be a clutch mechanism comprising a cylindrical member 30 of suitable resilient material, such as rubber composition, said member being positioned between the washers or disks 32 and 34 and supported from the cup-shaped portion 36 of said top follower by means of a rivet 38 passing through aligned openings in said washers, said member, and said cup-shaped portion.

Seated on the upper washer 34 as at 40 (Figure 2) may be the lower set of diametrically opposed friction shoes 42, 42, said set of shoes having complementary arcuate engaging surfaces 44, 44 with one of said sets of tapering faces 28, 28. As best seen from a consideration of Figure 4, the diagonally arranged inwardly directed surfaces 50, 50 formed on the upper portions of said shoes 42, 42 frictionally engage the complementary diagonally arranged friction surfaces 52, 52 provided on the lower side portions of the upper set of diametrically opposite shoes 54, 54 as at 56. The overlapping relationship of said sets of shoes may be clearly seen from Figures 3 and 4 wherein it may be noted that each shoe 54 of the outer set of shoes overlaps both shoes 42, 42 of the inner set of shoes. It may also be noted that said sets of shoes may be disposed along convenient angularly spaced axes, shown here as being spaced 90 degrees with respect to each other.

The upper set of shoes 54, 54 have complementary arcuate surfaces 58, 58 (Figure 1) in engagement with the corresponding set of tapering surfaces 28, 28 of said housing 26 and on their upper portions may be provided with diagonally arranged friction surfaces 60, 60 which engage the complementary wedge surfaces 62, 62 formed on the cup-shaped portion 30 of the top follower 4. Each shoe 42 and 54 may be relieved as at 46 and 64 respectively to reduce the weight of said shoes and as at 48 and 66 to receive the shank of said rivet 38.

After assembling said device, the resilient member 30 may be placed under suitable initial compression so that the friction developed between the different friction members will be sufficient to maintain said device in assembled relationship. It is apparent that varying the initial compression under which the resilient member is placed will modify the friction absorption developed by said device during operation. In operation, as load is applied, the pressures are transmitted through the sets of shoes and as the top follower moves downwardly, the sets of shoes are moved downward and forced inwardly thereby further compressing said resilient member, said shoes having frictional engagement with the sets of tapering faces on said housing and frictional engagement with each other and the outer set of shoes having engagement with the wedge faces on the top follower.

It will also be clear to those skilled in the art that variations in the angles of the friction surfaces may increase or decrease within reasonable limits the frictional absorption developed by my device. Smooth operation and uniform wear may be obtained by arranging the angular disposition of the friction surfaces so that uniform pressure per unit of area is provided between said sets of shoes and said housing.

In the modification shown in Figures 5 to 8, top and bottom followers 90 and 92 are provided around the outer circumference of their bases with the respective annular flanges 94 and 96 which afford seats as at 98 and 100 for the coil spring 102. The outer faces of said followers may be of general arcuate form and afford convenient seating means for the device, said faces being interrupted centrally by the respective openings 104 and 106 which afford positioning means for said device. Integrally formed with the bottom follower 92 may be the cylindrical housing or barrel 108 extending within the compression spring 102 and presenting on its inner surfaces pairs of internal diametrically tapering friction faces 110, 110 (Figure 5) and 112, 112 (Figure 6), said faces 110, 110 extending downwardly to points 111, 111 conveniently spaced from the top of said housing and said pairs of faces 112, 112 extending downwardly to points 113, 113 somewhat lower than said points 111, 111. Interrupting each of said faces 112, 112 adjacent the open end of said housing may be formed vertical flanges or lugs 114, 114 serving a purpose hereinafter described.

The top follower 90 is provided with a cup-shaped portion 116 which projects toward the housing 108 and supports therewithin a clutch assembly comprising a cylindrical resilient member 120 spaced from said top follower and positioned between the disks or washers 122 and 124. The said resilient member may be supported by means of a bolt 118 passing through aligned openings in said washers, said member, and said cup-shaped portion for threaded engagement with a nut 119. The said nut may be securely retained as by welding as at 121.

Seated on the upper washer 124 as at 126 may be the lower pair of diametrically opposite friction shoes 128, 128, said shoes having complementary outer arcuate faces 130, 130 in frictional engagement with the tapering surfaces 112, 112. The said arcuate faces 130, 130 may be interrupted by the vertical slots 132, 132 (Figure 8) which cooperate with said flanges 114, 114 in sliding engagement therewith to serve as guide means for retaining said shoes in normal arrangement within said housing. The lower edges 134, 134 of said flanges overlap the edges of the upper disk or washer 124 as at 136 and may have abutment thereagainst when the device is fully extended, thus serving to maintain said device in assembled relationship.

Diagonally arranged inwardly tapering wedge surfaces 142, 142 (Figure 7A) on the upper portions of said shoes 128, 128 frictionally engage complementary surfaces 144, 144 formed on the lower portions of a pair of diametrically opposite upper friction shoes 146, 146. The said upper set of shoes 146, 146 overlaps said inner set of shoes as is best seen in Figures 7 and 7A, said sets of shoes being conveniently spaced along axes at right angles to each other. The upper set of shoes 146, 146 are provided with complementary outer arcuate faces 148, 148 in frictional engagement with said sets of faces 110, 110 on said housing 108 and may have formed on their upper portions diagonally arranged friction faces 150, 150 in frictional engagement with complementary wedge surfaces 152, 152 formed on the cup-shaped portion 116 of the top follower 90. Each of the shoes 128 and 146 may be relieved as at 138 and 152 respectively to reduce weight and as at 140 and 154 respectively to receive the shank of said bolt 118 during operation. The said resilient member 120 may be given any desired initial compression by adjusting said nut 119.

As load is applied, said sets of friction shoes move downwardly and inwardly in frictional engagement with the cylindrical housing 108, with each other, and with the top follower, thus urging said resilient member and top follower apart and further compressing said resilient member.

The modifications shown in Figures 9 and 10 correspond generally to the aforedescribed modifications and differ therefrom in that means are provided on the bottom follower for increasing the frictional absorption of the device to a maximum just before the device is closed. It is understood, of course, that these modifications may be adapted and applied to the said aforedescribed modifications and inasmuch as the corresponding parts are substantially similar only a fragmentary view of the device is shown.

In Figure 9, the bottom follower 170 may be provided with an annular shelf or flange 172 projecting radially inward from the inner surfaces of the housing 174 adjacent the bottom thereof. The device is shown compressed to indicate the abutment of the washer 176 against the shelf 172 as at 178 whereby the resilient member 180 is further compressed between the washers 176 and 182, said washer 182 affording a seat as at 184 for the inner set of shoes 186. The shelf 172 may be positioned on said housing as desired so that the washer 176 may abut said shelf as the device closes.

In Figure 10 an annular flange 200 integrally formed on the base 202 of the bottom follower 204 extends into the housing 206. The top edge 208 of said flange affords abutment with the washer 210 as the device is closed and thus serves to further compress the resilient member 212.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a snubber, a coil spring, top and bottom followers seated thereagainst, one of said followers having an integral barrel extending within said spring and presenting internal tapering friction faces arranged in two sets along axes at approximately ninety degrees to each other, the other of said followers supporting a clutch mechanism within said barrel, said clutch mechanism comprising an auxiliary resilient member and two sets of friction shoes arranged in series between said other follower and said auxiliary resilient member in abutment with said sets of faces respectively, one set of said shoes having diagonal face engagement with said last-mentioned follower and with the shoes of the other set, and stop means on said barrel follower limiting the movement of said clutch mechanism and affording maximum compression for said auxiliary resilient member adjacent the end of the stroke.

2. In a snubber, a coil spring, top and bottom followers seated thereagainst, one of said followers having an integral barrel extending within said spring and presenting internal tapering friction faces arranged in two sets along axes at ninety degrees to each other, the other of said followers supporting a clutch mechanism within said barrel, said clutch mechanism comprising an auxiliary resilient member and two sets of friction shoes arranged in series between said other follower and said auxiliary resilient member in abutment with said sets of faces respectively, one set of said shoes having diagonal face engagement with said last-mentioned follower and with the shoes of the other set.

3. In a friction absorbing device, a coil spring, top and bottom followers seated thereagainst, said bottom follower having a friction barrel extending within said spring and presenting internal tapering friction faces disposed in two sets along axes at right angles to each other, a clutch mechanism supported from said top follower comprising an auxiliary resilient member and two sets of shoes arranged in series between said top follower and said auxiliary resilient member with the shoes of respective sets seated against said sets of faces respectively, and stop means on said bottom follower limiting the movement of said clutch mechanism whereby said auxiliary resilient member may be compressed to a maximum adjacent the end of the closing stroke.

4. In a friction absorbing device, top and bottom followers, a compression spring extending therebetween, said bottom follower having a barrel portion extending within said spring and presenting two sets of opposed tapering internal friction faces arranged along axes substantially at right angles to each other, and clutch means secured to said top follower and comprising an auxiliary resilient member spaced from said top follower, and two sets of friction shoes arranged in series between said auxiliary member and said top follower with the shoes of respective sets in abutment with said sets of friction faces respectively, each shoe of each set having diagonal frictional face engagement with both shoes of the other set.

5. In a friction absorbing device, top and bottom followers, a coil spring extending therebetween, said bottom follower having a friction barrel extending within said spring and presenting internal tapering friction faces, said top follower supporting a clutch mechanism within said barrel comprising a resilient member, and two sets of shoes arranged in series between said top follower and said resilient member with the shoes of respective sets arranged along axes at right angles to each other and in frictional engagement with each other and with said tapering friction faces, the shoes of one set having diagonal face engagement with the top follower and the shoes of respective sets having diagonal face engagement with each other.

6. In a friction absorbing device, a coil spring, top and bottom followers affording seats for opposite ends of said spring, said bottom follower having an integral friction barrel extending within said spring and presenting sets of opposed tapering internal friction faces along axes substantially at right angles to each other, a clutch mechanism supported from said top follower comprising an auxiliary resilient member and two sets of friction shoes arranged in series between said top follower and said auxiliary resilient member in frictional engagement with said faces, each shoe of one set having diagonal face engagement with the top follower and with two shoes of the other set.

7. In a friction absorbing device, a coil spring, top and bottom followers seated thereagainst, said bottom follower having a friction barrel extending within said spring and presenting internal tapering friction faces disposed in two sets along axes at right angles to each other, a clutch mechanism supported from said top follower comprising an auxiliary resilient member and two sets of shoes arranged in series between said top follower and said auxiliary resilient member with the shoes of respective sets seated against said sets of faces respectively, each shoe of one set having diagonal face engagement with said top follower and with each shoe of the other set.

8. In a friction absorbing device, a coil spring, top and bottom followers seated thereagainst, said bottom follower having a friction barrel extending within said spring and presenting internal tapering friction faces disposed in two sets along axes at right angles to each other, a clutch mechanism supported from said top follower comprising an auxiliary resilient member and two sets of shoes arranged in series between said top follower and said auxiliary resilient member with the shoes of respective sets seated against said sets of faces, respectively, and interengaging means on said barrel and the shoes of one set to prevent relative rotation thereof.

9. In a friction absorbing device, a compression spring, a bottom follower having a friction housing extending within said spring and presenting sets of spaced tapering wedge faces, a top follower having wedge means received within said spring and supporting clutch means in said housing, said clutch means comprising resilient means spaced from said wedge means, and a plurality of sets of shoes arranged in series longitudinally of said device and disposed along angularly spaced axes, said shoes having frictional engagement with said wedge faces and with each other, said resilient means being adjustably compressed to vary the frictional absorption developed.

10. In a friction absorbing device, a coil spring, a bottom follower having a cylindrical housing extending within said spring and presenting sets of internal tapering friction faces, a top follower, a clutch assembly supported from said top follower and projecting within said housing, said clutch assembly comprising a resilient member spaced from said top follower, and a plurality of sets of shoes extending between said top follower and said resilient member in frictional engagement with respective sets of said tapering faces, said sets of shoes being arranged in series for engagement with each other and disposed along angularly spaced axes.

11. In a friction absorbing device, a coil spring, a bottom follower having a housing extending within said spring and presenting sets of internal tapering friction faces, a top follower clutch assembly projecting within said housing for frictional engagement therewith, said clutch assembly comprising a resilient member spaced and supported from said top follower, and a plurality of sets of shoes in series extending between said top follower and resilient member and disposed along angularly spaced axes, said sets of shoes having overlapping relation ship longitudinally of said housing and frictional engagement with each other.

12. In a friction absorbing device, a coil spring, top and bottom followers seated thereagainst, said bottom follower having a friction barrel extending within said spring and presenting internal tapering friction faces disposed in two sets along axes at right angles to each other, a clutch mechanism supported from said top follower comprising an auxiliary resilient member and two sets of shoes arranged in series between said top follower and said auxiliary resilient member with the shoes of respective sets seated against said sets of faces respectively, and stop means on said bottom follower limiting the movement of said clutch mechanism.

13. In a snubber, a coil spring, top and bottom followers seated thereagainst, one of said followers having an integral barrel extending within said spring and presenting internal tapering friction faces arranged in two sets along axes at approximately ninety degrees to each other, the other of said followers supporting a clutch mechanism within said barrel, said clutch mechanism comprising an auxiliary resilient member and two sets of friction shoes arranged in series between said other follower and said auxiliary resilient member in abutment with said sets of faces respectively, and engaging means on said barrel and one set of said shoes to prevent relative rotation thereof.

14. In a friction absorbing device, top and bottom followers, a compression spring extending therebetween, said bottom follower having a barrel portion extending within said spring and presenting two sets of opposed tapering internal friction faces arranged along axes substantially at right angles to each other, and clutch means secured to said top follower and comprising an auxiliary resilient member spaced from said top follower, and two sets of friction shoes arranged in series between said auxiliary member and said top follower with the shoes of respective sets in abutment with said sets of friction faces respectively.

15. In a friction absorbing device, end followers, a coil spring seated therebetween, wedge surfaces on each of said followers received within said spring, resilient means supported from one of said followers and received within the other of said followers, and frictionally overlapping pairs of shoes disposed along angularly spaced axes and extending between said resilient means and its supporting follower, said shoes having complementary engaging surfaces with said wedge surfaces on the other of said followers, one of said pairs of shoes having frictional engagement with said supporting follower.

16. In a friction absorbing device, top and bottom followers, a coil spring extending therebetween, said bottom follower having a friction barrel extending within said spring and presenting internal tapering friction faces, said top follower supporting a clutch mechanism within said barrel comprising a resilient member and two sets of shoes arranged in series between said top follower and said resilient member with the shoes of respective sets arranged along axes at right angles to each other and in frictional engagement with each other and with said tapering friction faces.

17. In a snubber, a coil spring, top and bottom followers seated thereagainst, one of said followers having an integral barrel extending within said spring and presenting internal tapering friction faces arranged in two sets along axes at ninety degrees to each other, the other of said followers supporting a clutch mechanism within said barrel, said clutch mechanism comprising an auxiliary resilient member and two sets of friction shoes arranged in series between said follower and said auxiliary resilient member in abutment with said sets of faces respectively.

18. In a friction absorbing device, top and bottom followers, outer resilient means seated therebetween, a clutch assembly supported from said top follower and extending within said bottom follower and comprising inner resilient means, overlapping frictionally engaging sets of shoes in series arranged along angularly spaced axes and inserted between said top follower and said inner resilient means, one set having frictional engagement with said bottom follower, and the other set having frictional engagement with said top and bottom followers.

19. In a friction absorbing device, top and bottom followers, a coil spring extending therebetween, said bottom follower having a friction barrel extending within said spring and presenting internal tapering friction faces, said top follower supporting a clutch mechanism within said barrel comprising a resilient member, and two sets of shoes arranged in series between said top follower and said resilient member with the shoes of respective sets arranged along axes at right angles to each other.

20. In a friction absorbing device, a follower having a base with an annular flange affording a seat for an associated coil spring, a friction barrel presenting two sets of opposed tapering internal friction faces arranged substantially along axes at right angles to each other, and vertical means on one side of said sets of faces affording guide means for associated friction shoes.

21. In a friction absorbing device, a coil spring, a bottom follower having a housing with friction surfaces received within said spring, a top follower wedge, resilient means spaced and supported from said top follower wedge, and sets of shoes in alternate arrangement against said surfaces, said sets of shoes being arranged in series between said top follower wedge and said resilient means with each shoe of each set in abutment with two shoes of another set.

22. In a friction absorbing device, a coil spring, a bottom follower having a housing with friction surfaces received within said spring, a top follower wedge, resilient means spaced and supported from said top follower wedge, and sets of shoes in alternate arrangement against said surfaces, said sets of shoes being arranged in series between said top follower wedge and said resilient means with each shoe of each set in abutment with two shoes of another set, and guide means on said bottom follower for one of said sets of shoes.

23. In a friction absorbing device, a coil spring, a bottom follower having a housing with friction surfaces received within said spring, a top follower wedge, resilient means spaced and supported from said top follower wedge, and sets of shoes in alternate arrangement against said surfaces, said sets of shoes being arranged in series between said top follower wedge and said resilient means with each shoe of each set in abutment with two shoes of another set, and means on said bottom follower engaging means seated on said resilient means to retain said device in assembly.

24. In a friction absorbing device, a coil spring, a bottom follower having a housing with friction surfaces received within said spring, a top follower wedge, resilient means spaced and supported from said top follower wedge, and sets of shoes in alternate arrangement against said surfaces, said sets of shoes being arranged in series between said top follower wedge and said resilient means with each shoe of each set in abutment with two shoes of another set, and means on said bottom follower for increasing frictional absorption to a maximum as said device is closed.

25. In a snubber, a coil spring, end followers seated thereagainst, one of said followers having an integral barrel extending within said spring and presenting internal tapering friction faces, the other of said followers supporting a clutch mechanism within said barrel, said clutch mechanism comprising an auxiliary resilient member and two sets of friction shoes arranged in series between said last mentioned follower and said auxiliary resilient member and having abutment with said friction faces.

26. In a friction absorbing device, top and bottom followers, outer resilient means seated therebetween, a clutch assembly supported from said top follower and extending within said bottom follower and comprising inner resilient means, overlapping frictionally engaging sets of shoes in series between said top follower and said inner resilient means, one set having frictional engagement with said bottom follower, and another set having frictional engagement with said top and bottom followers.

27. In a friction absorbing device, top and bottom followers, outer resilient means seated therebetween, a clutch assembly supported from said top follower and extending within said bottom follower and comprising inner resilient means, overlapping frictionally engaging sets of shoes in series between said top follower and said inner resilient means, one set having frictional engagement with said bottom follower and another set having frictional engagement with said top and bottom followers, and stop means on said bottom follower engaging said clutch assembly as said device is closed to increase frictional absorption to a maximum.

28. In a friction absorbing device, top and bottom followers, outer resilient means seated therebetween, a clutch assembly supported from said top follower and extending within said bottom follower and comprising inner resilient means, overlapping frictionally engaging sets of shoes in series between said top follower and said inner resilient means, one set having frictional engagement with said bottom follower and another set having frictional engagement with said top and bottom followers, and interengaging means on said bottom follower and said clutch assembly to retain said device in assembly.

29. In a friction absorbing device, top and bottom followers, a coil spring seated therebetween, a clutch mechanism operable within said bottom follower and comprising inner resilient means supported from said top follower, and a plurality of sets of shoes interposed between said resilient means and said top follower and frictionally engaging said bottom follower, each shoe of each set having abutment with a plurality of shoe of another set.

30. In a friction absorbing device, follower wedges, a coil spring seated therebetween, a resilient member supported from one of said follower wedges within the other of said follower wedges, and overlapping sets of shoes interposed between said resilient means and its supporting follower wedge, one set of shoes having engagement with one of said follower wedges and the other set of shoes having engagement with both follower wedges.

31. In a friction absorbing device, a coil spring a bottom follower having internal friction surfaces extending within said spring, a top follower wedge, resilient means supported from said top follower wedge, and a plurality of sets of shoes in series engaging said friction surfaces each shoe of each set having wedge face engagement with two shoes of another set, one set of shoes being seated on said resilient means and another set having abutment with said top follower wedge.

32. In a friction absorbing device, a follower having a base with an annular flange affording a seat for an associated coil spring, a friction barrel presenting sets of opposed tapering internal friction faces arranged substantially along axes at right angles to each other, and vertical lugs interrupting certain of said faces to afford guide means for associated friction shoes.

33. In a friction absorbing device, a follower having a base with an annular flange affording a seat for an associated coil spring, a friction barrel presenting sets of opposed tapering internal friction faces arranged substantially along axes at right angles to each other, and an inner annular flange adjacent said base affording stop means for an associated clutch mechanism.

ROBERT B. COTTRELL.

CERTIFICATE OF CORRECTION.

Patent No. 2,279,914.

April 14, 1942.

ROBERT B. COTTRELL.

It is hereby certified that error appears in the printed specification of the above numbered patent requiring correction as follows: Page 1, first column, line 33, for "purpose" read --purposes--; line 45, for "not" read --no--; page 4, second column, line 47, claim 11, for "relation ship" read --relationship--; page 5, second column, line 11, claim 20, strike out "side"; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.